(12) United States Patent
Iwamoto

(10) Patent No.: US 7,291,829 B2
(45) Date of Patent: Nov. 6, 2007

(54) LIGHT INTENSITY DETECTOR

(75) Inventor: Masaki Iwamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/230,518

(22) Filed: Sep. 21, 2005

(65) Prior Publication Data
US 2006/0289729 A1  Dec. 28, 2006

(30) Foreign Application Priority Data
Jun. 22, 2005  (JP) ............... 2005-182622

(51) Int. Cl.
*H01J 40/14* (2006.01)
*G02B 26/08* (2006.01)
(52) U.S. Cl. ............... 250/225; 250/216; 359/251; 359/301
(58) Field of Classification Search ............... 250/225, 250/216; 359/246, 251, 301, 303, 304
See application file for complete search history.

(56) References Cited

U.S. PATENT DOCUMENTS

| 5,467,336 A | * | 11/1995 | Ando et al. | ............... | 369/13.29 |
| 5,963,357 A | | 10/1999 | Kubota et al. | | |
| 2005/0105848 A1 | | 5/2005 | Yamada et al. | | |

FOREIGN PATENT DOCUMENTS

| JP | 59-197012 A | 11/1984 |
| JP | 2-207215 A | 8/1990 |
| JP | 4-263215 | 9/1992 |
| JP | 4-311918 | 11/1992 |
| JP | 10-221664 | 8/1998 |
| JP | 2002-182050 | 6/2002 |
| JP | 2003-279604 A | 10/2003 |
| JP | 2004-271681 | 9/2004 |

OTHER PUBLICATIONS

EP 05255822 Search Report dated Oct. 9, 2006.

* cited by examiner

*Primary Examiner*—Kevin Pyo
(74) *Attorney, Agent, or Firm*—Westerman, Hattori, Daniels & Adrian, LLP.

(57) ABSTRACT

A polarization separating element such as a beam splitter receives a first light of a first polarization plane. The polarization separating element derives out of the first light a second light of a second polarization plane set perpendicular to the first polarization plane. A photoelectric element converts the second light into an electric signal. The intensity of the second light is in this manner detected. Since the second light is derived out of the first light, the phase of the second light is allowed to synchronize with the phase of the first light. The extinction ratio of the second light accurately reflects the extinction ratio of the first light. The detection of the intensity of the second light at the photoelectric element enables an accurate detection of the intensity of the first light.

7 Claims, 7 Drawing Sheets

LIGHT INTENSITY DETECTOR

BACKGROUND OF THE INVENTION

1. Field of the Invention

The present invention relates to a light intensity detector usually incorporated in an optical transmitting apparatus such as an optical modulator, for example.

2. Description of the Prior Art

An optical modulator is utilized to realize optical transmission of information. The optical modulator often includes an optical chip made of a dielectric crystal such as $LiNbO_3$. A light waveguide is formed in the optical chip. So-called electrooptic effect serves to induce a shift of phase of the input light in the light waveguide. This results in changes in the intensity of the input light. The obtained output light from the light waveguide is transmitted to the receiver through a fiber optics. The changes in the intensity of the light are utilized to discriminate binary values of information data.

An electric signal is input into a signal electrode on the optical chip from a signal source so as to shift the phase of the input light. If the biasing voltage for the electric signal suffers from the fluctuation of an operating point, such as a thermal drift, a direct current (DC) drift, or the like, the phase of the input light cannot shift with accuracy. A so-called feedback control is necessarily employed to adjust the biasing voltage for the electric signal at a uniform level. In this case, a photodiode is employed to monitor the intensity of the output light, for example.

As disclosed in Japanese Patent Application Publication 4-263215, a polarization separating circuit is related to the optical chip to monitor the intensity of the output light. A light including TM and TE polarizations is input into the light waveguide on the optical chip. The polarization separating circuit serves to derive the TM and TE polarizations from the light output from the light waveguide. The TM polarization is transmitted to the receiver or a destination through the fiber optics. The TE polarization is received at the photodiode.

The TE polarization is utilized for the detection of the intensity of the output light. As conventionally known, the optical chip provides different modulation efficiencies for the TE and TM polarizations, since the polarization plane of the TE polarization is perpendicular to that of the TM polarization. A shift of phase naturally occurs between the TE and TM polarizations. A difference in the extinction ratio may also be induced between the TE and TM polarizations. Accordingly, the intensity of the TM polarization cannot be monitored with accuracy at the photodiode in the polarization separating circuit of the mentioned publication.

SUMMARY OF THE INVENTION

It is accordingly an object of the present invention to provide a light intensity detector capable of detecting the intensity of a light with a higher accuracy.

According to the present invention, there is provided a light intensity detector comprising: a polarization separating element receiving a first light or optic beam of a first polarization plane, said polarization separating element deriving a second light or optic beam of a second polarization plane from the first light, the second polarization plane set perpendicular to the first polarization plane; and a photoelectric element receiving the second light.

The light intensity detector of the type allows the polarization separating element to derive the second light of the second polarization plane out of the first light of the first polarization plane perpendicular to the second polarization plane. The derived second light is then received by the photoelectric element. The photoelectric element converts the second light into an electric signal. The intensity of the second light is in this manner detected. Since the second light is derived out of the first light, the phase of the second light is allowed to synchronize with the phase of the first light. The extinction ratio of the second light accurately reflects the extinction ratio of the first light. The detection of the intensity of the second light at the photoelectric element enables an accurate detection of the intensity of the first light.

The polarization separating element may be a beam splitter. The beam splitter may include a polarization film intersecting a datum imaginary plane along an inclined imaginary line, the datum imaginary plane set perpendicular to the optical axis of the first light and intersecting the first polarization plane along a reference imaginary line, the inclined imaginary line shifting from the reference imaginary line around the optical axis of the first light by a predetermined rotation angle. The polarization separating element of the type completely serves to derive the second light out of the first light.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
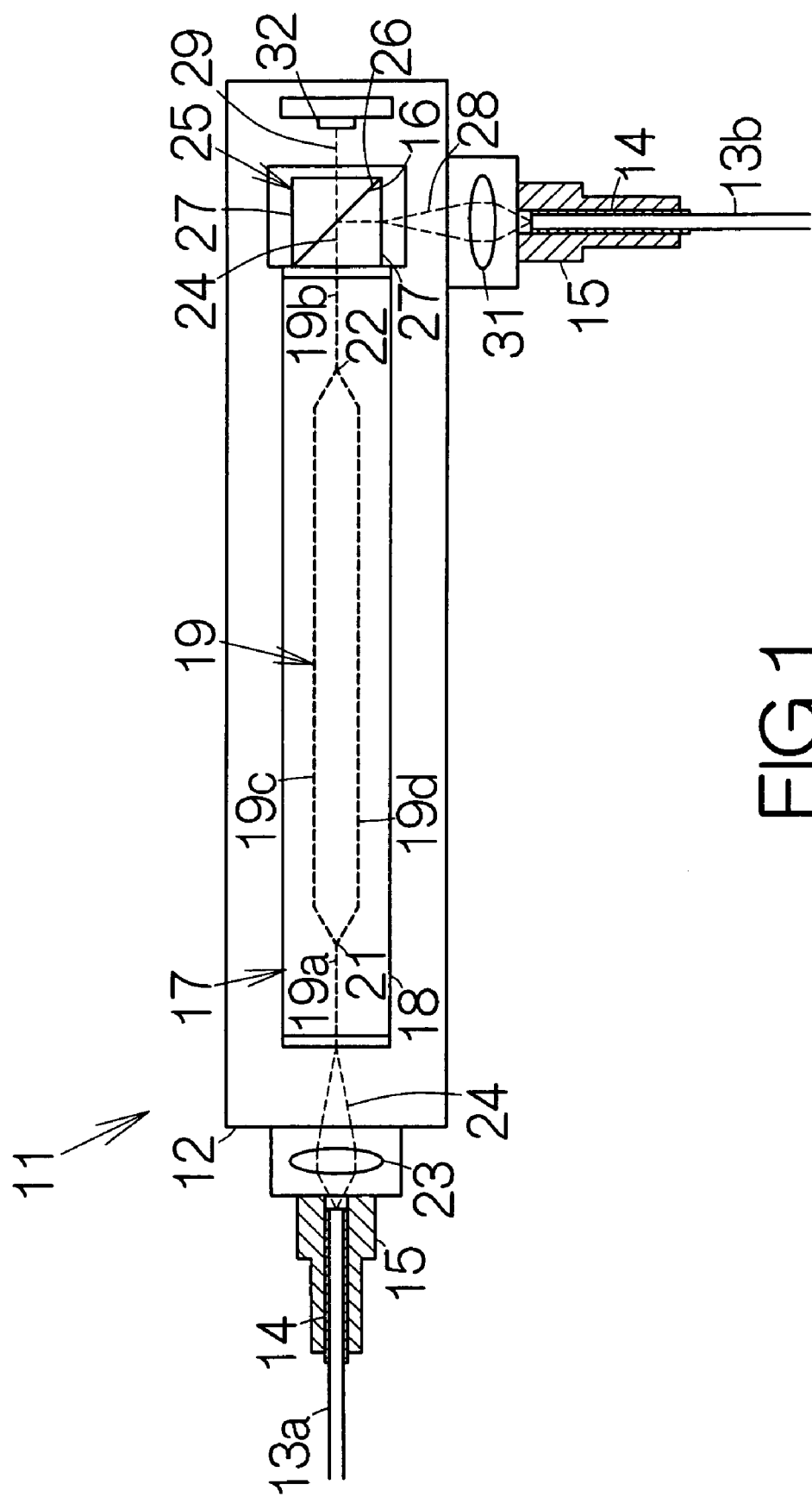
FIG. 1 is a plan view schematically illustrating the structure of an optical modulator according to a first embodiment of the present invention.

FIG. 1 schematically illustrates the structure of an optical modulator 11 according to a first embodiment of the present invention. The optical modulator 11 is a so-called Mach-Zehnder type modulator, for example. The optical modulator 11 includes a casing 12. An input fiber optics 13a and an output fiber optics 13b are coupled to the casing 12. A ferrule 14, for example, is attached to the tip ends of the individual fiber optics 13a, 13b so as to assist the connection of the input and output fiber optics 13a, 13b with the casing 12.

The individual ferrule 14 is coupled with a corresponding connecter 15. The connecters 15 are removably fixed to the casing 12.

The optical axis of the fiber optics 13a is designed to bend at right angles based on the reflection at a reflection plane 16. The optical axis after the reflection is aligned with the optical axis of the fiber optics 13b. A polarization maintaining fiber, PMF, such as a PANDA (Polarization-maintaining AND Absorption-reducing) fiber is utilized in the fiber optics 13a. As conventionally known, the polarization maintaining fiber utilizes a local stress in the cross-section of the optical fiber so as to keep the polarization plane uniform.

An optical chip 17 is located in a space between the fiber optics 13a and the reflection plane 16 in the casing 12 for optical transmission. The optical chip 17 includes a substrate 18 made of a dielectric crystal such as $LiNbO_3$ and a light waveguide 19 formed in the substrate 18 along the upper flat surface of the substrate 18. A so-called z-cut substrate is employed as the substrate 18. The light waveguide 19 is designed to extend across the substrate 18 along the optical axis of the fiber optics 13a.

The light waveguide 19 includes an input path 19a and an output path 19b both defined on a common straight line. The input path 19a is designed to extend from the end surface of the substrate 18 near the fiber optics 13a. The output path 19b is designed to extend so as to reach the other end surface of the substrate 18 near the reflection plane 16. The input and output paths 19a, 19b are connected to each other through first and second bifurcations 19c, 19d. The bifurcations 19c, 19d are bifurcated at predetermined divarications 21, 22 from the input and output paths 19a, 19b. The first and second bifurcations 19c, 19d may extend in parallel with each other.

A lens 23 is incorporated between the fiber optics 13a and the input path 19a. A first light or TM polarization 24 is output from the fiber optics 13a. The lens 23 serves to lead the TM polarization 24 to the input path 19a. The TM polarization 24 is transmitted within a first polarization plane extending in the vertical direction perpendicular to the upper flat surface of the optical chip 17. The TM polarization 24 is kept throughout the light waveguide 19.

A polarization separating element or beam splitter 25 is connected to the output path 19a so as to provide the reflection plane 16. The beam splitter 25 includes a polarization or multilayered film 26 interposed between a pair of prisms 27, 27. The multilayered film 26 provides the reflection plane 16. The multilayered film 26 generates a first or reflection light 28 reflected on the reflection plane 16. The multilayered film 26 also generates a second or through light 29. The through light 29 passes through the reflection plane 16.

A lens 31 is incorporated between the beam splitter 25 and the fiber optics 13b. The lens 31 is located on the optical axis of the reflection light 28. The lens 31 serves to lead the reflection light 28 to the fiber optics 13b. A photoelectric element or photodiode (PD) 32 is located on the optical axis of the through light 29. The photodiode 32 serves to convert the through light 29 into an electric signal. Here, the beam splitter 25 and the photodiode 32 in combination provide a light intensity detector according to the present invention.

Figure 2:
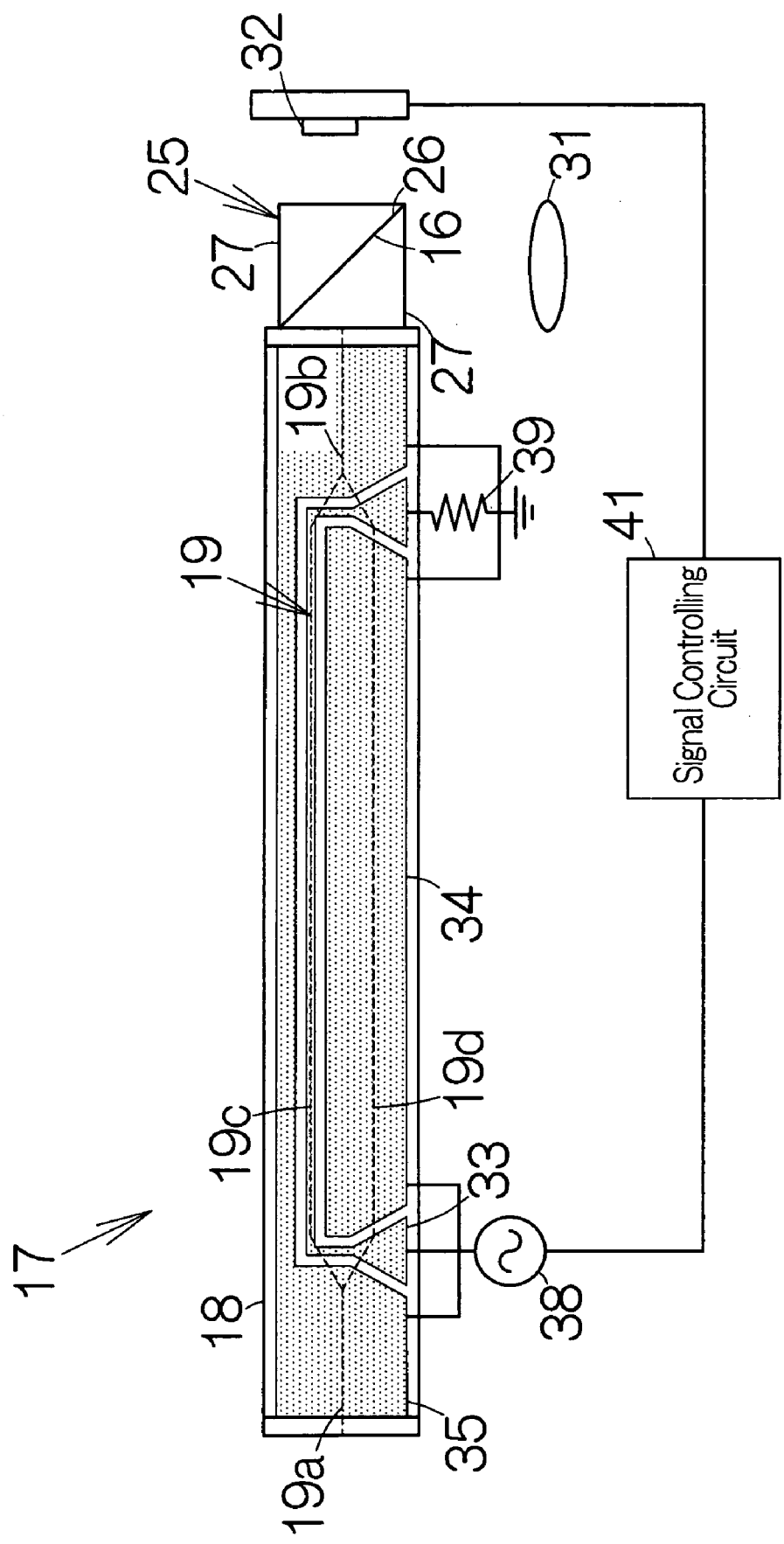
FIG. 2 is a plan view schematically illustrating the structure of an optical chip.

As shown in FIG. 2, a signal electrode 33 is formed on the upper flat surface of the substrate 18. The signal electrode 33 is designed to extend along the first bifurcation 19c. A first ground electrode 34 extends on the upper flat surface of the substrate 18 in parallel with the signal electrode 33. The first ground electrode 34 is isolated from the signal electrode 33. Likewise, a second ground electrode 35 extends on the upper flat surface of the substrate 18 in parallel with the signal electrode 33. The signal electrode 33 is located in a space between the first and second ground electrodes 34, 35. The second ground electrode 35 is also isolated from the signal electrode 33.

One end of each electrode 33, 34 and 35 is connected to a signal source 38. The other end of each electrode 33, 34 and 35 is connected to a terminator 39. The signal source 38 supplies an electric signal to the signal electrode 33. A signal controlling circuit 41 is connected to the signal source 38. The signal controlling circuit 41 is connected to the photodiode 32.

The signal controlling circuit 41 is designed to receive an electric signal from the photodiode 32. The signal controlling circuit 41 controls the biasing voltage for the electric signal supplied from the signal source 38 based on the electric signal from the photodiode 32. The signal controlling circuit 41 thus realizes a so-called feedback control, as described later in detail. As a result, the fluctuation of an operating point, such as a thermal drift, a direct current (DC) drift, or the like, is compensated in the biasing voltage. The biasing voltage is accordingly maintained in an optimum level.

Figure 3:
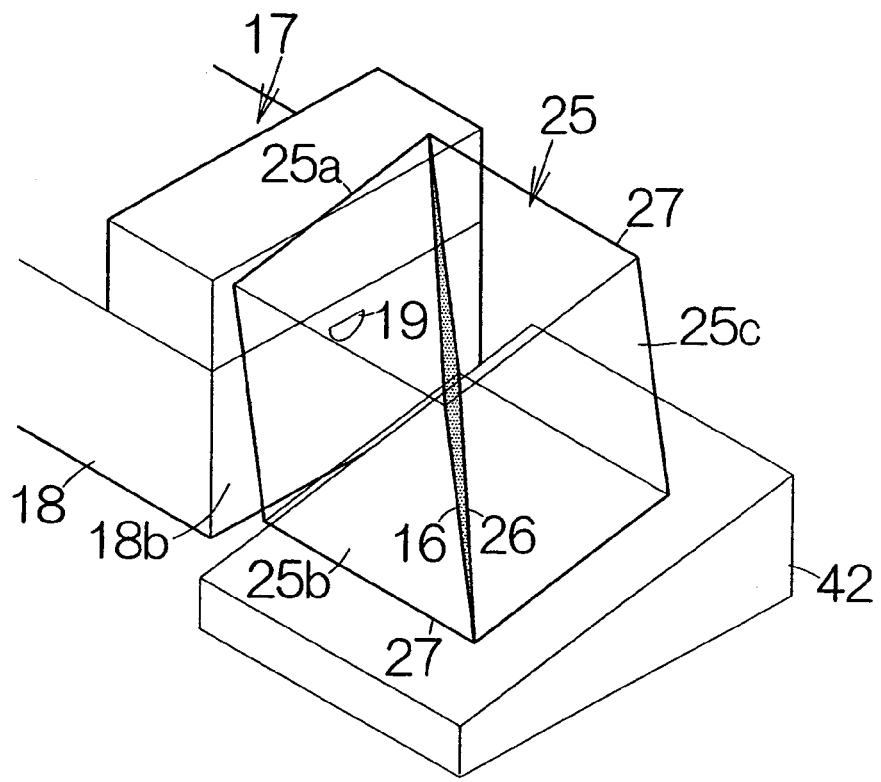
FIG. 3 is an enlarged perspective view schematically illustrating the attitude of a beam splitter relative to the optical chip.

As shown in FIG. 3, the beam splitter 25 is formed in the shape of a hexahedron. The edges of the hexahedron may have the dimension in a range between 50 μm and 1 mm approximately, for example. An adhesive is utilized to fix the beam splitter 25 on the end surface of the optical chip 17, for example. The beam splitter 25 is received on a base 42.

The beam splitter 25 includes an incidence surface 25a opposed to the output end of the light waveguide 19. A first output surface 25b is defined on the beam splitter 25. The first output surface 25b intersects an imaginary plane including the incidence surface 25a. A second output surface 25c is likewise defined on the beam splitter 25. The second output surface 25c intersects an imaginary plane including the first output surface 25b. The second output surface 25c is also included in an imaginary plane opposed to the imaginary plane including the incidence surface 25a.

Figure 4:
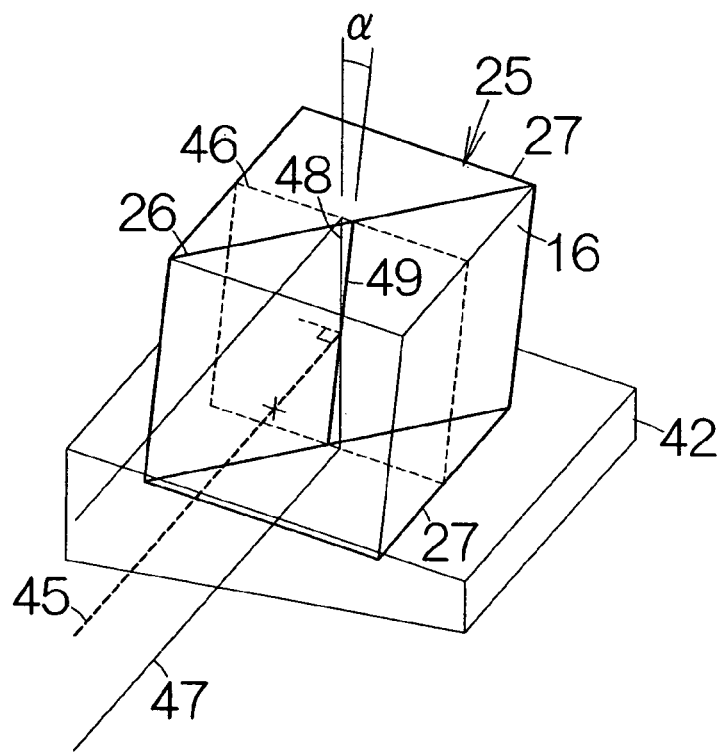
FIG. 4 is an enlarged perspective view of the beam splitter for schematically illustrating the structure thereof.

As shown in FIG. 4, a datum imaginary plane 46 is defined within the beam splitter 25. The datum imaginary plane 46 is set perpendicular to the optical axis 45 of the TM polarization 24. The intersection between the datum imaginary plane 46 and the optical axis 45 is located within the reflection plane 16. The datum imaginary plane 46 intersects the first polarization plane 47 of the TM polarization 24 at a first imaginary line 48. The first imaginary line 48 corresponds to a reference imaginary line according to the present invention. In this case, since the first polarization plane 47 is set perpendicular to the upper flat surface of the optical chip 17, the first imaginary line 48 extends in parallel with the vertical direction perpendicular to the upper flat surface of the optical chip 17. The multilayered film 26 intersects the datum imaginary plane 46 at a second imaginary line 49. The second imaginary line 49 shifts from the first imaginary line 48 around the optical axis 45 of the TM polarization 47 by a predetermined rotation angle α. The rotation angle α may be set at three degrees approximately, for example. The second imaginary line 49 corresponds to an inclined imaginary line according to the present invention.

Figure 5:
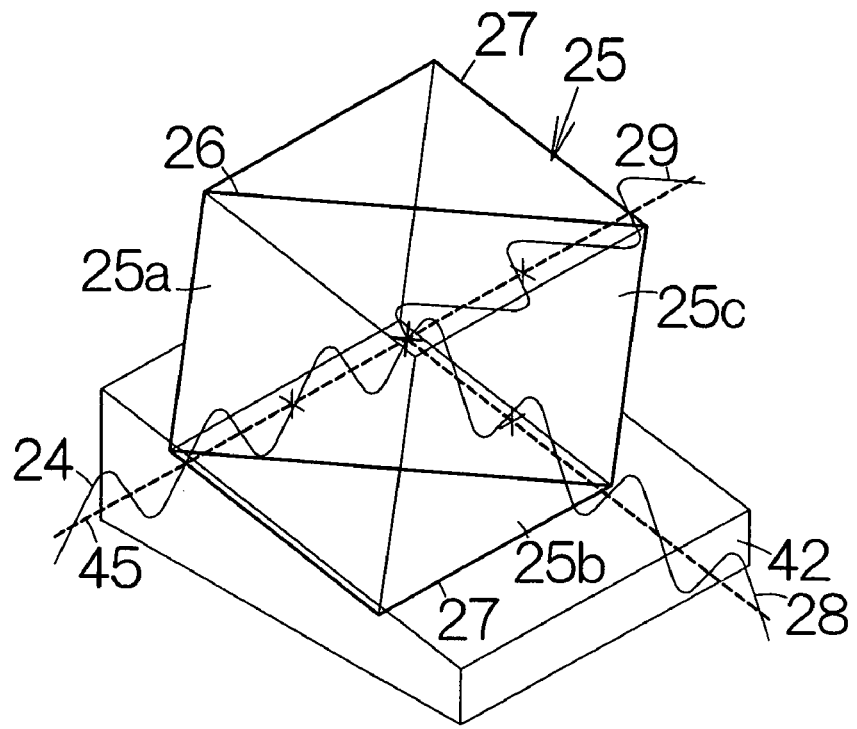
FIG. 5 is an enlarged perspective view of the beam splitter for schematically illustrating the path of light through the beam splitter.

As shown in FIG. 5, the TM polarization 24 is led into the beam splitter 25 through the incidence plane 25a. The TM polarization 24 is reflected on the multilayered film 26. The reflection light 28 is thus generated. The reflection light 28 is output from the first output surface 25b. The multilayered film 26 also generates the through light 29 passing through the reflection plane 16. The through light 29 corresponds to the TE polarization transmitted within a second polarization plane perpendicular to the aforementioned first polarization plane. The through light 29 is output from the second output surface 25c.

Here, if the rotation angle α of the second imaginary line 49 is set at zero degree, the multilayered film 26 intersects the datum imaginary plane 46 at the first imaginary line 48. In other words, the second imaginary line 49 is aligned with the first imaginary line 48. The TM polarization 24 led into the incidence plane 25a is completely reflected on the surface of the multilayered film 26. No through light 29 can be derived from the TM polarization 24. On the other hand, if a deviation increases from zero degree in the rotation angle α, the amount of the through light 29 increases. The amount of the through light 29 can in this manner be controlled based on the adjustment of the rotation angle α.

If the rotation angle α is set at three degrees approximately as described above, the loss of the TM polarization can be suppressed to the level of 0.01 [dB] approximately in the reflection light 28. The loss of the TM polarization 24 cannot influence the accurate transmission of information. On the other hand, the lost TM polarization in a smaller amount is converted into the through light 29. The photodiode 32 has a capability enough to detect the intensity of the through light 29 in such a smaller amount.

Figure 6:
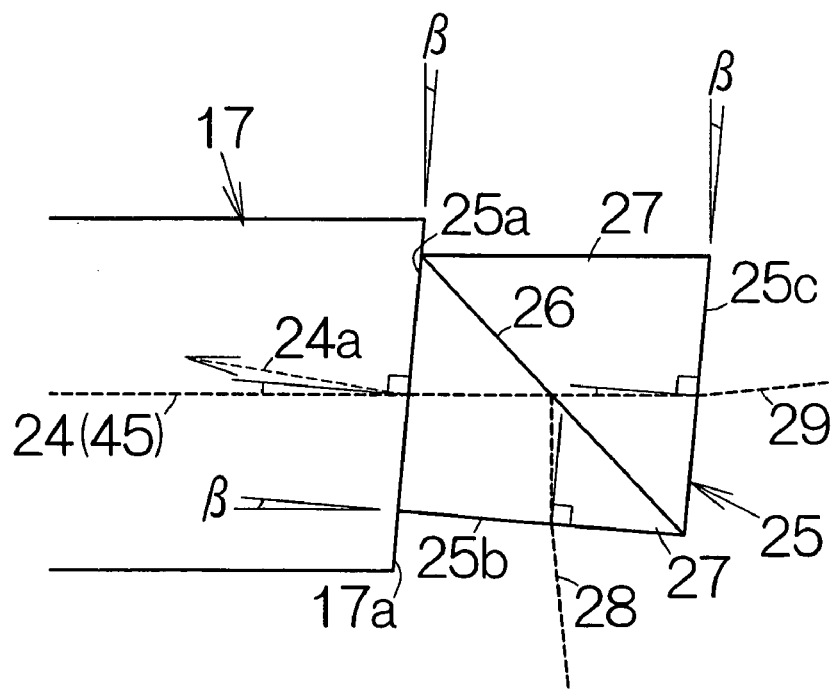
FIG. 6 is an enlarged plan view schematically illustrating the outlines of the optical chip and the beam splitter.

As shown in FIG. 6, an end surface 17a of the optical chip 17 intersects an imaginary reference plane at a predetermined inclination angle β. The imaginary reference plane is set perpendicular to the optical axis 45 of the TM polarization 24. The incidence surface 25a of the beam splitter 25 is designed to contact the end surface 17a of the optical chip 17. A reflected light 24a is generated at the contact between the end surface 17 and the incidence surface 25a based on the TM polarization 24. A predetermined inclination angle β allows the reflected light 24a to follow a path off the first polarization plane 45. The reflected light 24a is reliably prevented from reversion to the light waveguide 19. The reflected light 24a is thus prevented from causing interference with the TM polarization 24.

The first output surface 25b of the beam splitter 25 likewise intersects an imaginary reference plane at the predetermined inclination angle β. The imaginary reference plane is similarly set perpendicular to the optical axis of the reflection light 28. A light reflected from the first output surface 25b is thus reliably prevented from reversion to the reflection plane 16 in the similar manner as described above. The second output surface 25c of the beam splitter 25 also intersects an imaginary reference plane, perpendicular to the optical axis of the through light 29, at the predetermined inclination angle β. Accordingly, a light reflected from the second output surface 25c is reliably prevented from reversion to the reflection plane 16 in the similar manner as described above. The predetermined inclination angle β may be set at six degrees approximately, for example. The prisms 27, 27 may be subjected to polishing process for establishment of the mentioned incidence surface 25a and first and second output surfaces 25b, 25c.

Next, description will be made on the action of the optical modulator 11. The input light or TM polarization 24 is input into the fiber optics 13a from a light source such as a laser diode (LD), not shown. The first polarization plane of the TM polarization 24 is kept uniform in the fiber optics 13a. The lens 23 serves to lead the TM polarization 24 into the input path 19a. The TM polarization 24 subsequently divaricates at the divarication 22 to the first and second bifurcations 19c, 19d. The TM polarization 24 is substantially divided into halves at the divarication 22. The TM polarization is then led into the first and second bifurcations 19c, 19d.

An electric signal is input to the signal electrode 33 from the signal source 38. The electric signal serves to generate an electric field acting on the first bifurcation 19c. The electric field allows the first bifurcation 19c to cause a change in the refractive index of the TM polarization 24. So-called electrooptic effect serves to induce a shift of phase of the TM polarization in the first bifurcation 19c. The shift corresponds to binary values "1" and "0" of the electric signal. The TM polarizations 24 guided through the first and second bifurcations 19c, 19d are combined at the divarication 22. The intensity changes in the TM polarization after combined in response to differences in the phase of the TM polarization before combined.

The TM polarization 24 is led into the beam splitter 25 through the incidence surface 25a. As described above, the TM polarization 24 generates the reflection light 28 from the multilayered film 26. The reflection light 28 is output through the first output surface 25b. The lens 31 serves to guide the reflection light 28 into the fiber optics 13b. The reflection light 28 or optical signal is transmitted to a receiver or destination through the fiber optics 13b. Information data can be read out based on the intensity of the reflection light 28 at the receiver.

The TM polarization 24 also generates the through light 29 passing through the multilayered film 26. The through light 29 is output from the second output surface 25c. The photodiode 32 generates an electric signal based on the through light 29. The generated electric signal is supplied to the signal controlling circuit 41. The signal controlling circuit 41 correspondingly outputs a control signal to the signal source 38. The biasing voltage is optimally controlled for the signal source 38 based on the control signal. The signal controlling circuit 41 in this manner realizes a feedback control on the output of the signal source 38.

The optical modulator 11 enables conversion of the TM polarization 24 as a main signal into the through light 29 received at the photodiode 32. The phase of the through light 29 synchronizes with the phase of the TM polarization 24 and the reflection light 28. Likewise, the extinction ratio of the through light 29 coincides with that of the TM polarization and the reflection light 28. In other words, the through light 29 accurately reflects the intensity of the TM polarization 24 and the reflection light 28. The detection of the intensity at the photodiode 32 thus accomplishes with a higher accuracy the detection of the intensity of the TM polarization 24 and the reflection light 28. This allows a further accurate control on the biasing voltage for the signal source 38. A higher stability can be established for the optical modulator 11.

Moreover, the beam splitter 25 is simply incorporated in the optical modulator 11 so as to take out a light supplied to the photodiode 32. The beam splitter 25 thus enables detection of the intensity of a light output from the optical chip 17 with a simple structure. Additional structures such as attachments are not required in the optical chip 17 and the fiber optics 13a, 13b so as to generate a light led to the photodiode 32. The assembling process of the optical modulator 11 can thus be simplified. The production cost of the optical modulator 11 can significantly be reduced.

The beam splitter 25 serves to bend the optical axis of the fiber optics 13a at right angles based on the reflection at the reflection plane 16. The optical axis after the reflection is aligned with the optical axis of the fiber optics 13b. It is thus not necessary to set both the fiber optics 13a, 13b on a common straight line. The optical modulator 11 is made shorter than ever. The optical modulator 11 can be placed within a downsized enclosure, for example, along with other components such as a light source, an amplifier, and the like.

Now, assume that the attitude of the fiber optics 13a is adjusted relative to the optical chip 17. As described above, a polarization maintaining fiber, PMF, such as a PANDA fiber, is employed as the fiber optics 13a. As conventionally known, local stress is established in the core of the PMF fiber at a pair of points in the cross-section of the PMF fiber. The clad layer near the points is utilized to generate the local stress in the core. The local stress in the core serves to keep the polarization plane uniform in the optical fiber.

As described above, a so-called z-cut substrate is employed as the substrate 18. As conventionally known, the substrate of this type is designed to provide a higher modulation efficiency for the phase of the TM polarization 24. The first polarization plane of the TM polarization 24 must be set in the vertical direction perpendicular to the upper flat surface of the optical chip 17 with a higher accuracy. The fiber optics 13a should thus be subjected to adjustment of the attitude relative to the optical chip 17 for aligning the first polarization plane of the TM polarization 24 in the vertical direction.

Figure 7:
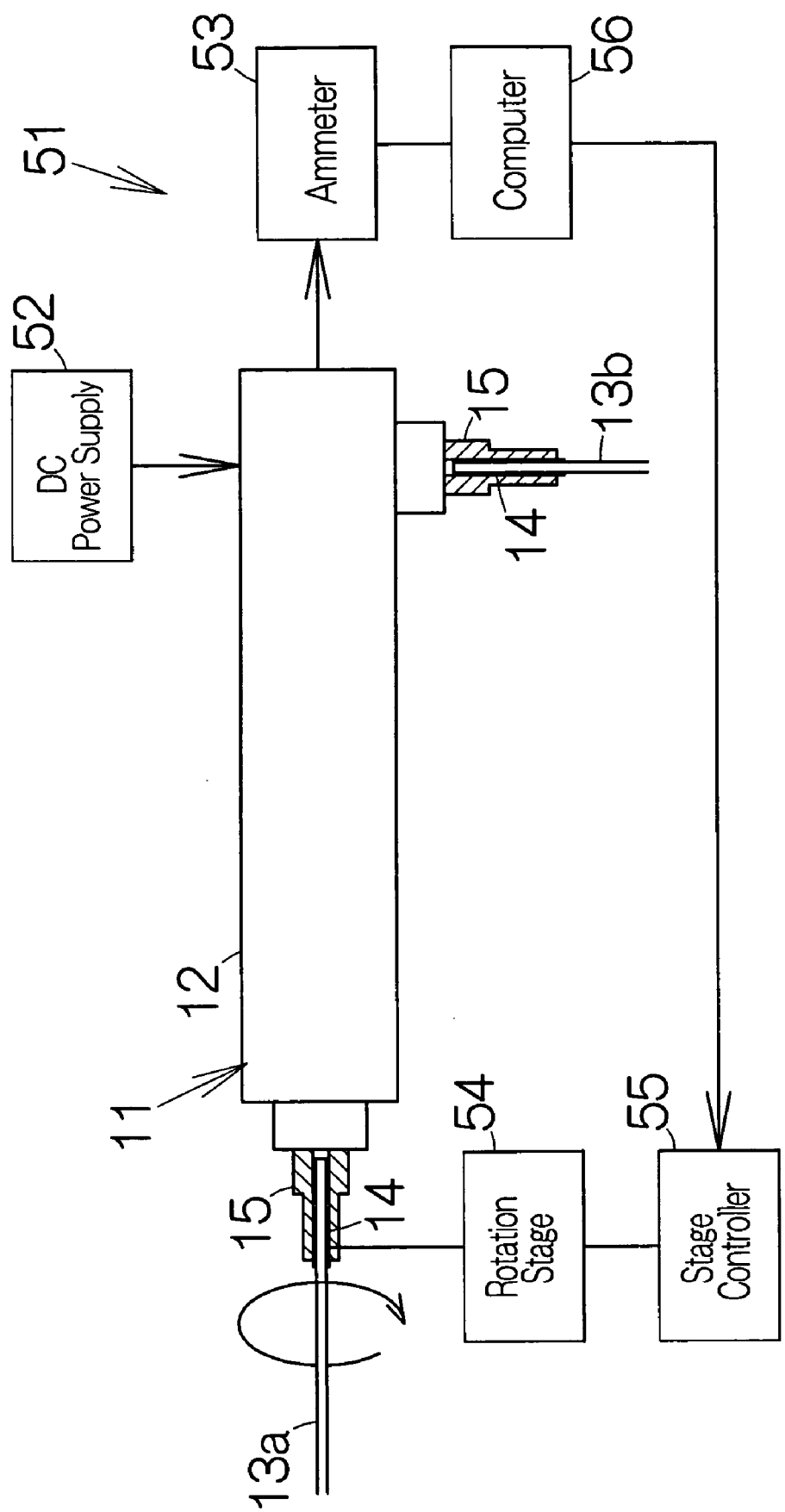
FIG. 7 is a plan view schematically illustrating the structure of a rotation adjusting device for rotating a fiber optics.

As shown in FIG. 7, a rotation adjusting device 51 is prepared for the adjustment of the attitude of the fiber optics 13a. The aforementioned optical modulator 11 is set in the rotation adjusting device 51. The fiber optics 13a is coupled to the optical chip 17 for relative rotation around the optical axis of the fiber optics 13a. A direct current power supply 52 is coupled to the photodiode 32. Electric current supplied from the direct current power supply 52 drives the photodiode 32. An ammeter 53 is also coupled to the photodiode 32. The photodiode 32 generates an electric signal based on the through light 29. The ammeter 53 is utilized to measure the current value of the electric signal.

The fiber optics 13a is mounted on a rotation stage 54. The rotation stage 54 is allowed to rotate the fiber optics 13a around the optical axis of the fiber optics 13a. A relative rotation is in this manner generated between the fiber optics 13a and the optical chip 17 around the optical axis of the fiber optics 13a. A stage controller 55 is connected to the rotation stage 54. The stage controller 55 serves to supply a control signal to the rotation stage 54 so as to induce the movement of the rotation stage 54.

A computer 56 is connected to the stage controller 55. The computer 56 is also connected to the aforementioned ammeter 53. The computer 56 is designed to supply a control signal to the stage controller 55 in response to the measurement values at the ammeter 53. The control signal specifies the rotation angle of the fiber optics 13a around the optical axis. The rotation angle of the fiber optics 13a may be determined based on a software program installed in the computer 56, for example.

The direct current power supply 52 applies a biasing voltage to the photodiode 32. The TM polarization 24 is input to the fiber optics 13a from the light source. The TM polarization 24 is led into the light waveguide 19. The TM polarization 24 is subsequently output from the output path 19b. The TM polarization 24 is then led into the beam splitter 25 through the incidence surface 25a. Since the second imaginary line 49 shifts from the first imaginary line 48 around the optical axis by the rotation angle α, the through light 29 is output to the photodiode 32. The photodiode 32 thus generates an electric signal. The ammeter 53 detects a current value based on the generated electric signal.

The computer 56 then supplies the control signal to the stage controller 55. The stage controller 55 drives the rotation stage 54 based on the control signal. The fiber optics 13a rotates around its optical axis based on the movement of the rotation stage 54. The ammeter 53 constantly detects the current value while the fiber optics 13a is driven for rotation. The first polarization plane of the TM polarization 24 is rotated around the optical axis of the fiber optics 13a based on the rotation of the fiber optics 13a. If the first imaginary line 48 is aligned with the second imaginary line 49 based on the rotation of the first polarization plane of the TM polarization 24, the TM polarization 24 is completely reflected on the multilayered film 26. No through light 29 reaches the photodiode 32. Only a dark current flows through the photodiode 32. The ammeter 53 thus detects the minimum current value based on the dark current.

When the ammeter 53 has detected the minimum current value, the computer 56 supplies a control signal to the stage controller 55. The control signal is set to specify the aforementioned rotation angle α, namely three degrees approximately, in the backward direction. The stage controller 55 drives the rotation stage 54 based on the control signal. The fiber optics 13a is, thus rotated around its optical axis by the rotation angle α. The second imaginary line 49 accordingly shifts from the first imaginary line 48 around the optical axis by the rotation angle α. The first polarization plane of the TM polarization 24 is set with accuracy in the vertical direction perpendicular to the upper flat surface of the optical chip 17. The attitude of the fiber optics 13a is thus accurately set relative to the optical chip 17.

The rotation adjusting device 51 allows variation in the electric current at the ammeter 53 in response to the shift between the first and second imaginary lines 48, 49, as described above. When the second imaginary line 49 is aligned with the first imaginary line 48, the minimum current value is established at the ammeter 53. The rotation angle α is in this case established with a higher accuracy between the first and second imaginary lines 48, 49 based on the rotation of the fiber optics 13a from the attitude establishing the minimum current value at the ammeter 53. The first polarization plane of the TM polarization 24 is thus accurately set relative to the optical chip 17.

Figure 8:
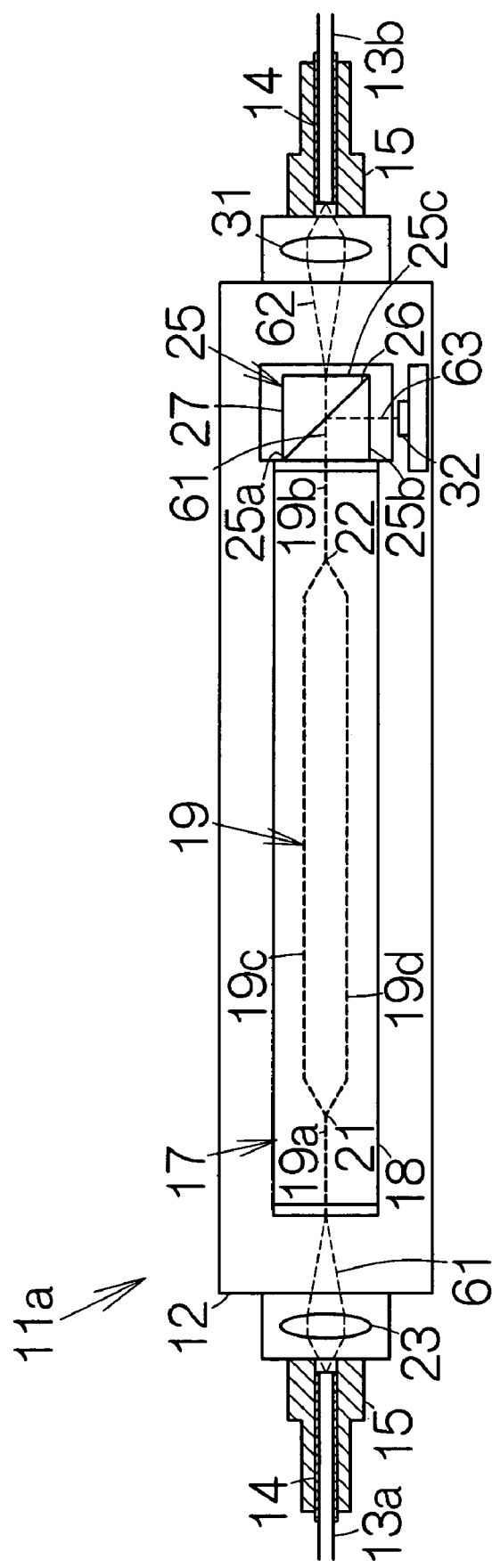
FIG. 8 is a plan view schematically illustrating the structure of an optical modulator according to a second embodiment of the present invention.

FIG. 8 schematically illustrates the structure of an optical modulator 11a according to a second embodiment of the present invention. The optical modulator 11a allows alignment of the fiber optics 13a, 13b on a common straight line. The input and output paths 19a, 19b of the light waveguide 19 are also defined on the common straight line. A so-called x-cut substrate is employed as the substrate 18. As conventionally known, the substrate of this type is designed to provide a higher modulation efficiency for the phase of the TE polarization. Accordingly, the TE polarization 61 is led to the optical chip 17 from the fiber optics 13a. The first polarization plane of the TE polarization 61 is set in parallel with the upper flat surface of the optical chip 17.

The optical modulator 11a of the type likewise includes the beam splitter 25 coupled to the output path 19b. The TE polarization 61 is led into the beam splitter 25 through the incidence surface 25a. The multilayered film 26 generates a through light 62 of the TE polarization passing through the reflection plane 16. The through light 62 is output from the second output surface 25c. The TE polarization 61 is simultaneously reflected on the multilayered film 26. This results in generation of a reflection light 63. The reflection light 63 corresponds to the TM polarization within the second polarization plane perpendicular to the first polarization plane. The reflection light 63 is output from the first output surface 25b. The lens 31 is located on the optical axis of the through light 62. The photodiode 31 is located on the optical axis of the reflection light 63. Like reference numerals are attached to structure or components equivalent to those of the aforementioned first embodiment.

Figure 9:
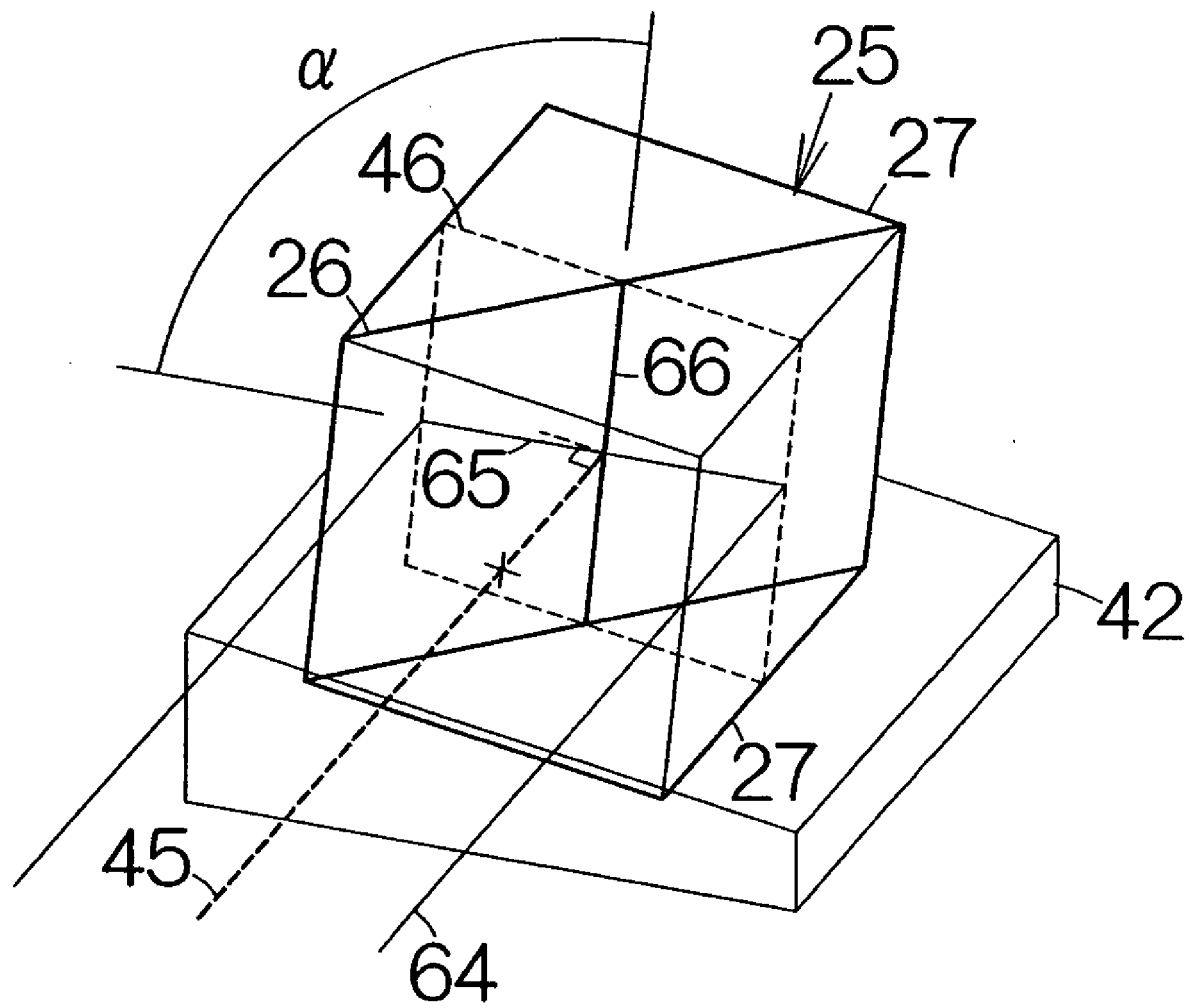
FIG. 9 is an enlarged perspective view schematically illustrating the structure of a beam splitter.

As shown in FIG. 9, the datum imaginary plane 46 is defined within the beam splitter 25. The datum imaginary plane 46 intersects the first polarization plane 64 of the TE polarization 61 at a first imaginary line 65. The first imaginary line 65 corresponds to a reference imaginary line according to the present invention. Since the first polarization plane 64 is set in parallel with the upper flat surface of the optical chip 17, the first imaginary line 65 extends in parallel with the upper flat surface of the optical chip 17. The multilayered film 26 intersects the datum imaginary plane at a second imaginary line 66. The second imaginary line 66 shifts from the first imaginary line 65 around the optical axis 45 by a predetermined rotation angle α. Since the first polarization plane 64 is set perpendicular to the polarization plane of the TM polarization, the predetermined rotation angle α may be set at 93 degrees approximately, for example. The second imaginary line 66 corresponds to an inclined imaginary line according to the present invention.

Here, if the rotation angle α of the second imaginary line 66 is set at 90 degrees, the second imaginary line 66 is set perpendicular to the first imaginary line 65. In this case, the beam splitter 25 allows all the TE polarization 61 to pass through the multilayered film 26. No reflection light 63 can be derived from the TE polarization 61. On the other hand, as a deviation increases from 90 degrees in the rotation angle α, the amount of the reflection light 63 increases. The amount of the reflection light 63 can in this manner be controlled based on the adjustment of the rotation angle α.

If the rotation angle α is set at 93 degrees approximately as described above, the loss of the TE polarization 61 can be suppressed to the level of 0.01 [dB] approximately in the through light 62. The loss of the TE polarization 61 cannot influence the accurate transmission of information. On the other hand, the lost TE polarization in a smaller amount is converted into the reflection light 63. The photodiode 32 has a capability enough to detect the intensity of the reflection light 63 in such a smaller amount.

The optical modulator 11a enables conversion of the TE polarization 61 as a main signal into the reflection light 63 received at the photodiode 32. The phase of the reflection light 63 synchronizes with the phase of the TE polarization 61 and the through light 62. Likewise, the extinction ratio of the reflection light 63 coincides with that of the TE polarization 61 and the through light 62. In other words, the reflection light 63 accurately reflects the intensity of the TE polarization 61 and the through light 62. The detection of the intensity at the photodiode 32 thus accomplishes with a higher accuracy the detection of the intensity of the TE polarization 61 and the through light 62. This allows a further accurate control on the biasing voltage for the signal source 38. A higher stability can be established for the optical modulator 11a. Furthermore, the optical modulator 11a enables employment of the rotation adjusting device 51 to adjust the attitude of the fiber optics 13a in a facilitated manner in the same manner as the aforementioned optical modulator 11.

What is claimed is:

1. A light intensity detector comprising:
   a polarization separating element receiving a first polarized light, said polarization separating element deriving a second polarized light from the first polarized light, the second polarized light having a polarization plane set perpendicular to a polarization plane of the first polarized light; and
   a photoelectric element receiving the second polarized light;
   wherein said polarization separating element is a beam splitter, the beam splitter including a polarization film intersecting a datum imaginary plane along an inclined imaginary line, the datum imaginary plane set perpendicular to an optical axis of the first polarized light and intersecting the polarization plane of the first polarized light along a reference imaginary line, the inclined imaginary line shifting from the reference imaginary line around the optical axis of the first polarized light by a predetermined rotation angle.

2. The light intensity detector according to claim 1, wherein the polarization separating element includes a polarization film, and the first polarized light is reflected on the polarization film.

3. The light intensity detector according to claim 2, wherein the second polarized light is derived from the first polarized light at the polarization film, and the second polarized light is output from the polarization separating element in a direction different from a direction of the reflected first polarized light.

4. The light intensity detector according to claim 2, wherein the first polarized light is a transverse magnetic (TM) polarized light.

5. The light intensity detector according to claim 1, wherein the polarization separating element includes a polarization film, and the first polarized light passes through the polarization film.

6. The light intensity detector according to claim 5, wherein the second polarized light is derived from the first polarized light at the polarization film, and the second polarized light is output from the polarization separating element in a direction different from a direction of the first polarized light.

7. The light intensity detector according to claim 5, wherein the first polarized light is a transverse electric field (TE) polarized light.

* * * * *